Sept. 30, 1930. A. DOUTHIT 1,776,943
EXPLOSIVE ENGINE
Filed Oct. 21, 1929 2 Sheets-Sheet 2
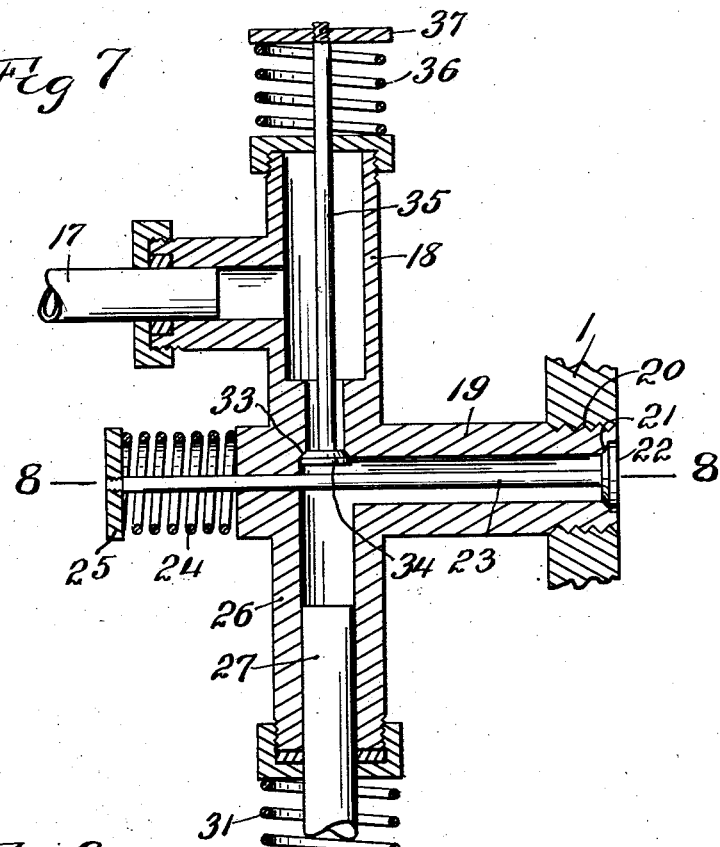
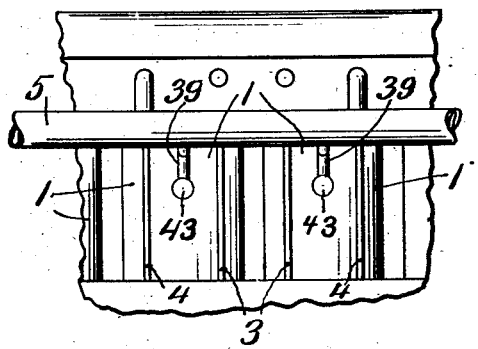
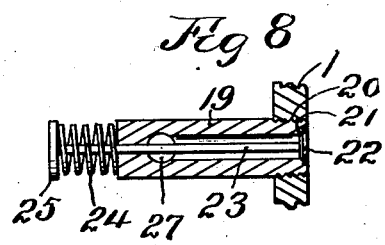
INVENTOR.
Archie Douthit
BY
Warren N. House
His ATTORNEY.

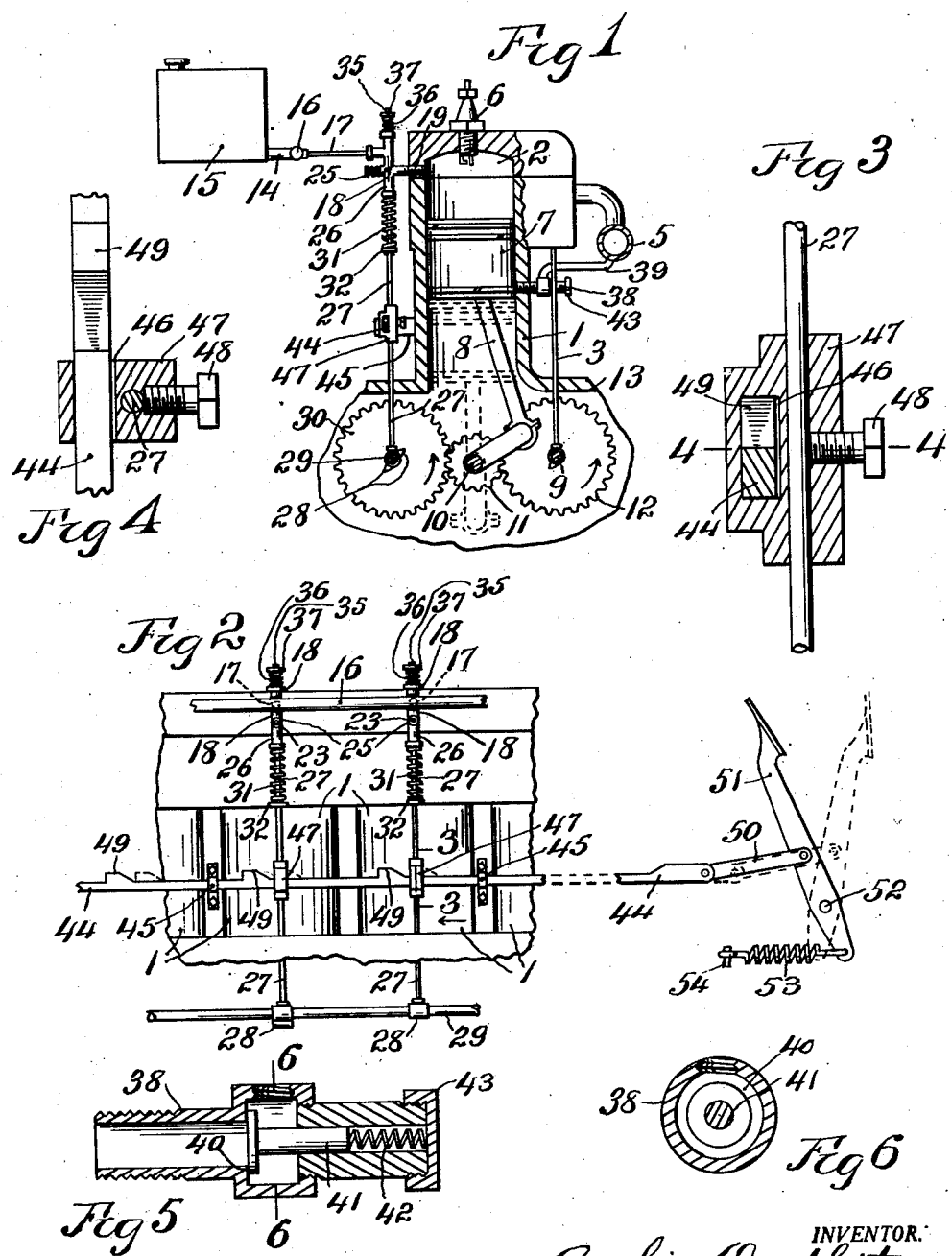

Patented Sept. 30, 1930

1,776,943

UNITED STATES PATENT OFFICE

ARCHIE DOUTHIT, OF KANSAS CITY, MISSOURI

EXPLOSIVE ENGINE

Application filed October 21, 1929. Serial No. 401,025.

My invention relates to improvements in explosive engines.

One of the objects of my invention is the provision of novel means for increasing the force of a charge exploded in the combustion chamber, and to increase the period during which the charge has effective action upon the piston.

A further object of my invention is to provide novel means for introducing water into the combustion chamber after a charge has been exploded therein and while the piston is on its power stroke, whereby the water is converted into steam the expansive effect of which has effective action after the piston has moved to a position in which the greater part of the power of the exploded charge has been expended.

Still another object of my invention is to provide a water introducing means of the kind described, which is simple, cheap, durable, not likely to get out of order, which is efficient, and which may be quickly and readily applied to explosive engines now in use with little alteration thereof.

The novel features of my invention are hereinafter fully described and claimed.

In the accompanying drawings, which illustrate my invention in the preferred embodiment thereof, Fig. 1 is an end elevation of my improved attachment, shown mounted on an explosive engine of usual type, parts of the structure being removed and parts broken away.

Fig. 2 is a side elevation showing my improved attachment, partly broken away, mounted on an engine parts of which are broken away.

Fig. 3 is an enlarged section on the line 3—3 of Fig. 2.

Fig. 4 is a section on the line 4—4 of Fig. 3.

Fig. 5 is an enlarged central longitudinal sectional view of the valve casing of one of the auxiliary exhaust valves.

Fig. 6 is a section on the line 6—6 of Fig. 5.

Fig. 7 is an enlarged central vertical sectional view of the valve casing forming part of the water conductor, and parts connected therewith.

Fig. 8 is a reduced section on the line 8—8 of Fig. 7.

Fig. 9 is a side elevation looking at the side of the engine opposite the side shown in Fig. 2.

Similar reference characters designate similar parts in the different views.

In the drawings I have shown my improvement as being applied to but two of the cylinders 1 of a usual type of explosive engine, but after reading the description which follows, it will be obvious that the improvement may be applied in like manner to an engine having more cylinders.

The engine shown has, as usual a combustion chamber 2 in the top of each cylinder 1, the usual intake push rods 3, exhaust push rods 4, exhaust pipe 5, and spark plug 6, Figs. 1, 2 and 9.

7 designates the usual power piston in the cylinder 1, 8 the connecting rod, 9 the cam shaft, 10 the crank shaft, and 11 and 12 the two gear wheels respectively mounted on the crank shaft 10 and cam shaft 9 and meshing with each other. 13 designates the usual crank case supporting the cylinders 1 and containing the crank shaft 10 and gears 11 and 12.

My invention provides a water conductor comprising a pipe 14 connected at one end to a reservoir, as a tank 15 adapted to contain a water supply and supported in any desired manner.

The other end of the pipe 14 is connected to a cross pipe 16, from which extend branch pipes 17 respectively connected to valve casings 18, Figs. 1 and 2.

The valve casings 18 correspond in number to, and are respectively provided with externally threaded branches 19 fitted respectively in threaded holes 20 in the cylinders 1, Figs. 1 and 7. The holes 20 respectively communicate with the combustion chambers 2 of the cylinders 1.

Each branch 19 at its discharge end is provided with a seat 21 against which is normally seated a valve 22 having a stem 23 which extends through and is slidably fitted in the wall of the casing 18. A coil spring 24 bears against the outer wall of the casing 18 and against a collar 25 fastened to the stem 23, Fig. 7. The spring 24 normally seats the valve 22.

The valve casings are also respectively provided with vertical branches 26, Figs. 1, 2 and 7 in which are respectively vertically slidably fitted pistons 27, which extend through and are slidably fitted in the top of the crank case 13, Figs. 1 and 2. The lower ends of the pistons 27 are disposed respectively in the paths of cams 28 with which a horizontal rotary shaft 29 is provided. The shaft 29 is mounted rotatably in the crank case 13 and has mounted on it and rotatable therewith a spur gear wheel 30 having the same diameter as the gear wheel 12 and, like it, meshing with the spur gear wheel 11.

For normally forcing the pistons downwardly into the paths respectively of the cams 28, coil springs 31 respectively encircle the pistons 27, and respectively bear at one set of ends against the valve casings 18 and at their other set of ends bearing respectively against collars 32 respectively fastened on the pistons 27, Figs. 1 and 2.

Each valve casing 18 between the branches 19 and 26 thereof is provided with a valve seat 33, Fig. 7, against which is normally seated a valve 34 having a stem 35 which extends through the wall of the casing and is slidable therein. Coil springs 36 respectively encircle the valve stems 35 and respectively bear at one set of ends against the casings 18, and at their other set of ends bearing respectively against collars 37 respectively fastened to the stems 35, Figs. 1, 2 and 7.

When the engine is running and the crank shaft 10 is turning, the gear wheel 30 will be revolved by the gear wheel 11 simultaneously and at the same speed as is the gear wheel 12. The cam shaft 29 will be rotated, and the cams 28, being properly disposed, will consecutively lift the pistons 27, thus causing water, which is in the branches 19 and 26, to be ejected by the pistons 27, past the check valves 22 into the combustion chambers 2 respectively.

The cams 28 are so disposed on the shaft 29, that in each cylinder combustion chamber 2, the water admitted thereto will enter after a charge has been exploded in that chamber and while the adjacent power piston 7 is on its power stroke, preferably when the piston has about completed a third of its power stroke, at which time the greatest effect of the exploded charge will have been expended.

The water thus admitted into the combustion chamber 2 will at once be converted into steam by the intense heat of the exploded charge, and the steam thus formed by its expanding force will continue to drive the piston to the end of its stroke, as indicated by dotted lines in Fig. 1. Thus after the principal force of the exploded charge has been expended, the expansive power of the steam, which is under great pressure, will continue to be exerted against the piston to the end of its power stroke.

To relieve the exhaust valves, not shown, from the great pressure still exerted by the steam at the end of the power strokes of the pistons 7, so that the push rods 4 can easily open the exhaust valves, there are provided valves, the casings 38 of which have threaded ends fitted in threaded holes in the walls respectively of the cylinders 1 at points just above the upper ends of the power pistons 7, when the latter are at the ends of their power strokes, as shown in dotted lines in Fig. 1.

In the walls respectively of the valve casings 38 are respectively fitted exhaust pipes 39 which are connected to the main exhaust pipe 5, Figs. 1 and 9.

In each valve casing 38 is a seat 40, Fig. 5, against which is normally seated a valve 41, which is slidably fitted in the casing 38 and has bearing against it a coil spring 42 which also bears against a screw cap 43 with which the casing 38 is provided. The valve 41 opens from the cylinder 1 to which the casing 38 is attached.

When the pistons reach the ends of their power strokes, the steam and exhaust products will escape to a large extent through the valve casings 38 and pipes 39 into the exhaust pipe 5, thus permitting the pressure to lower in the cylinders, so that the usual exhaust valves connected therewith can be easily lifted to clear the cylinders of the remaining steam and gaseous products of combustion.

In order that the admission of water into the cylinders by the mechanisms already described may be manually controlled, the following described mechanism is employed.

A horizontal longitudinally reciprocative bar 44 is mounted in bearings 45, Figs. 1 and 2, on the engine body. Said bar 44 is extended through and slidably mounted in slots 46 respectively of blocks 47 which are respectively adjustably fastened by means of set screws 48 on the pistons 27, Figs 2, 3 and 4.

The upper side of the bar 44 is provided with cams 49 adapted, when the bar 44 is moved to the right to the positions shown in dotted lines in Fig. 2, to engage respectively and lift the blocks 47 simultaneously, and with said blocks lift said pistons 27, so that the lower ends of the pistons 27 are out of the paths of the cams 28. After the cams 49 have lifted the pistons 27 by means of the blocks 47, the mechanism will become inactive for feeding water from the water conductors into the combustion chambers.

After the bar 44 has been again retracted to the position shown in solid lines in Fig. 2, the cams 49 will move out of the slots 46 in the blocks 47, thus permitting the springs 31 to force the pistons 27 downwardly until the lower ends of the latter are respectively in the paths of the cams 28 of the rotary shaft 29, and the water feeding mechanism will again become active.

For reciprocating the bar 44, one end thereof is pivoted to a link 50 which is pivoted to a foot pedal 51 oscillatively mounted on a horizontal bolt 52, Fig. 2. The pedal 51 is movable by the operator from the inactive position, shown in dotted lines in Fig. 2, to the active position shown in solid lines in said figure. For normally automatically retracting the pedal 51, and with it the bar 44, to the inactive position, the pedal 51 has attached to it one end of a coil spring 53, which is attached to the pedal at the side of the bolt 52 opposite to that at which the link 50 is attached. The other end of the coil spring 53 is attached to a pin 54 mounted on the engine body.

In the operation of the invention, the engine having been started, the operator depresses the pedal 51 from the inactive position, shown in dotted lines, to the position shown in solid lines in Fig. 2, thereby forcing the bar 44 to the left, as viewed in Fig. 2, and causing the cams 49 to move out of the slots 46 in the blocks 47, following which the springs 31 will force the pistons 27 downwardly in the branches 26 of the valve casings 18, and into the paths respectively of the cams 28 of the rotary shaft 29.

The downward movement of the pistons 27 in the branches 26, by creating a partial vacuum therein, will cause the valves 34 to open against the tension of the springs 36, thus permitting water to flow past said valves 34 into the branches 19 and 26. When the pistons 27 are in the paths of the cams 28, their downward movement will stop, and water will cease passing the valves 34 into the branches 19 and 26.

The cams 28 are so adjusted and fixed on the shaft 29, that they will respectively effect the lifting of the pistons 27 after the charges in the combustion chambers 2 have been exploded, and, preferably, after the pistons 7 have moved a substantial distance on their power strokes.

As the engine is running, the cams 28 will consecutively force upwardly the pistons 27, thus forcing water from the branches 19 past the valves 22 into the combustion chambers 2, at such times as the charges have been exploded and the pistons are on their power strokes. The water thus injected will be converted into steam, the expansive effect will continue against the power pistons 7 until the latter uncover the auxiliary exhaust valve casings 38 through which steam will escape into the pipes 39, and thence into the exhaust pipe 5, the valves 41 being opened against the pressure of the springs 42.

During the running of the engine, the operator keeps the pedal 51 depressed, thus rendering the water feeding mechanism active. When he stops the engine, he releases the pedal 51, at which the spring 53 will retract the pedal to the dotted inactive position, as shown in Fig. 2, upon which the link 50 will retract the bar 44 to a position in which the cams 49 will enter the slots 46 of the blocks 47, thus lifting the pistons 27 out of the paths of the cams 28 of the rotary shaft 29. The feeding mechanism will then become inactive, and will remain so until the operator again depresses the pedal 51.

I do not limit my invention to the structure shown and described, as many modifications, within the scope of the appended claims, may be made without departing from the spirit of my invention.

What I claim is:—

1. In an explosive engine, the combination with a cylinder having a combustion chamber, charge admitting, exploding and exhaust means, and a piston adapted for travel in said cylinder, of a reservoir for water, a conductor connected to and adapted to receive water from said reservoir and having two branches one of which communicates with said chamber, a check valve in said branch which opens toward said chamber, a pump piston reciprocative in the other branch, a check valve in said conductor opening toward said chamber and located between said branches and said reservoir, yielding means for normally forcing said pump piston outwardly, and means actuated by the first named piston while moving on its power stroke for forcing said pump piston inwardly after a charge has been exploded in said chamber.

2. In an explosive engine, a power cylinder having a combustion chamber, a water conductor communicating with said chamber, a rotary shaft having a cam, a reciprocative piston in said conductor which piston when moved in one direction forces water through said conductor into said chamber and disposed in the path of said cam and adapted to be moved thereby in said direction, means for normally forcing said piston in the opposite direction, and manually controlled oscillative means including a reciprocative bar having a cam adapted when said bar is moved in one direction to engage and move said piston out of the path of said cam.

3. In an explosive engine, a power cylinder having a combustion chamber, a water conductor having two branches one of which communicates with said chamber, a piston reciprocative in the other branch and which when moved in one direction forces water through said first named branch into said chamber, a check valve in said first named branch opening toward said chamber, a check valve in said conductor at the rear of said branches, means for normally forcing said piston in the opposite direction, a rotary shaft having a cam adapted to engage said piston and force the latter in the first named direction, and manualy controlled means for moving said piston out of the path of said cam.

In testimony whereof I have signed my name to this specification.

ARCHIE DOUTHIT.